(12) United States Patent
Yeh

(10) Patent No.: US 9,354,405 B2
(45) Date of Patent: May 31, 2016

(54) RETENTION MMEBER FOR POSITIONING OPTICAL MODULE

(71) Applicant: FOXCONN INTERCONNECT TECHNOLOGY LIMITED, Grand Cayman (KY)

(72) Inventor: Cheng-Chi Yeh, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/555,514

(22) Filed: Nov. 26, 2014

(65) Prior Publication Data

US 2015/0311635 A1    Oct. 29, 2015

(30) Foreign Application Priority Data

Apr. 23, 2014  (TW) .............................. 103114601 A

(51) Int. Cl.
*G02B 6/42*  (2006.01)
*G02B 6/36*  (2006.01)
*H01R 12/71*  (2011.01)
*H01R 13/639*  (2006.01)
*H01R 12/85*  (2011.01)

(52) U.S. Cl.
CPC ............ *G02B 6/4228* (2013.01); *H01R 12/716* (2013.01); *G02B 6/36* (2013.01); *H01R 12/85* (2013.01); *H01R 13/639* (2013.01)

(58) Field of Classification Search
CPC .............................. G02B 6/4228; H01R 12/716
See application file for complete search history.

(56) References Cited

U.S. PATENT DOCUMENTS 7,255,490 B2 *  8/2007  Zhang .................. G02B 6/4246
385/139

FOREIGN PATENT DOCUMENTS

CN        102141654 A      8/2011

* cited by examiner

*Primary Examiner* — Jerry Rahll
(74) *Attorney, Agent, or Firm* — Wei Te Chung; Ming Chieh Chang

(57) ABSTRACT

A retention member (100) includes a seat (1), a locking member (2) and a protecting member (22) assembled on the seat (1), the locking member (2) can rotate to be released and has a body portion (20), the protecting member (22) has an enwrapping portion (220) locating on an outer side of the body portion (20) of the locking member (2), a pair of retention portions (221) extending from opposite ends of the enwrapping portion (220), the retention portions (221) are initially resisted by the seat (1) to limit the rotation of the protecting member (22) and the locking member (2), the retention portions (221) also can be raised to break away from the resisting of the seat (1) and the locking member (2) then can be rotated to be released.

20 Claims, 6 Drawing Sheets

RETENTION MMEBER FOR POSITIONING OPTICAL MODULE

BACKGROUND OF THE INVENTION

1. Field of the Invention

The present invention relates generally to a retention member, and more particularly to a retention member for positioning an optical module and assembling the optical module to an electrical connector.

2. Description of Related Art

Chinese patent number 102141654A issued to Xie on Aug. 3, 2011 discloses a conventional electrical connector for positioning an optical module. The optical module converts optical signals to electrical signals and then the electrical signals are transferred to the electrical contacts of the electrical connector. The electrical connector defines a retention member, a plurality of electrical contacts received in the retention member and a cover assembled on the retention member. The cover can be rotated between an open position and a closed position to position the optical module. The retention member includes a slot. The cover includes a shaft received in the slot to mount the cover on the retention member. When assemble the optical module, the operator needs to open the cover and put the optical module on the retention member and then close the cover, the operation is complicated. And the shaft is easy loosening due to a long time used, which will affect the force that the cover presses on the optical module.

Hence, it is desirable to provide an improved electrical connector to overcome the aforementioned disadvantages.

SUMMARY OF THE INVENTION

Accordingly, an object of the present invention is to provide a retention member for positioning optical module and assembling the optical module to an electrical connector.

According to one aspect of the present invention, a retention member positioned on a substrate for mounting optical module and fiber assembly aligning with the optical module and includes a seat, a locking member assembled on the seat for positioning the seat on the substrate and a protecting member assembled on the seat, the locking member can rotated to be released, the locking member has a body portion, the protecting member has an enwrapping portion locating on an outer side of the body portion of the locking member, a pair of retention portions extending from opposite ends of the enwrapping portion, the retention portions are initially resisted by the seat to limit the rotation of the protecting member and the locking member, the retention portions also can be raised to break away from the resisting of the seat and the locking member then can be rotated to be released.

Other objects, advantages and novel features of the invention will become more apparent from the following detailed description when taken in conjunction with the accompanying drawings, in which:

DETAILED DESCRIPTION OF THE INVENTION

Figure 1:
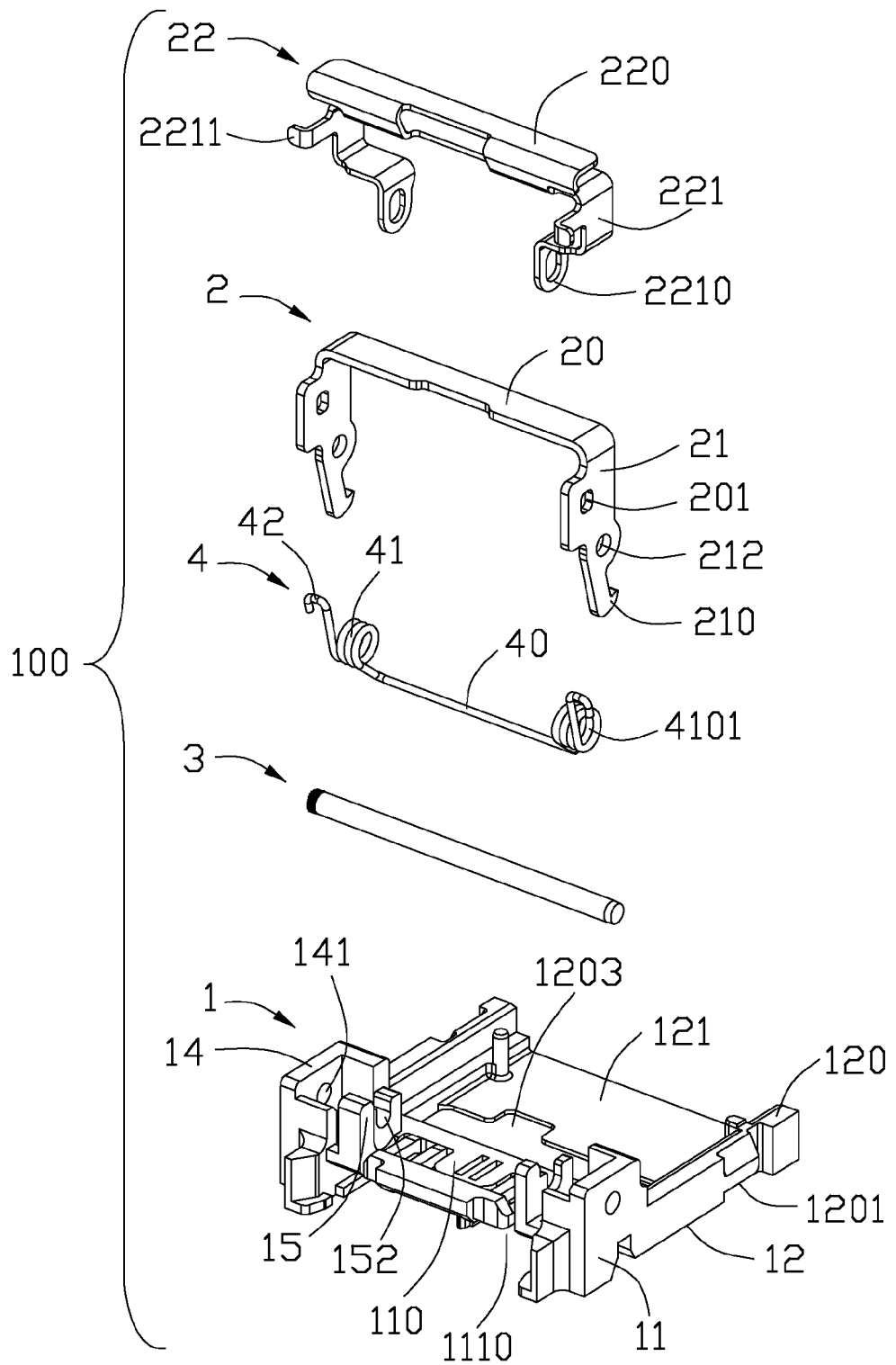
FIG. 1 is an exploded view of a retention member according to the present invention.

Reference will now be made to the drawings to describe the present invention in detail. The present invention is an improved invention according to a US patent application Ser. No. 14/162,762, which filed on Jan. 24, 2014.

Referring to FIGS. 1-4, a retention member 100 of the present invention is used for positioning an optical module 8. The retention member 100 includes a seat 1, a locking member 2 assembled to the seat 1, a rod member 3 assembled to the seat 1 for positioning the locking member 2 to the seat 1, a spring 4, and a protecting member 22 assembled to the rod member 3 and moveable between an upper free position and a lower restraint position.

Referring to FIGS. 1, 2 and 5-6, the seat 1 is made of insulating material and includes a support portion 12 and a head portion 11 extending from the support portion 12. The support portion 12 includes a bottom wall 121 and a pair of sidewalls 120 extending from opposite ends of the bottom wall 121. The bottom wall 121 and the pair of sidewalls 120 form a receiving space 1203 for receiving the optical module 8. The sidewall 120 includes a block 1201. The head portion 11 defines a top surface 110 higher than the bottom wall 121, a bottom surface 111 opposite to the top surface 110, a pair of through holes 131 penetrating the top surface 110 and the bottom surface 111, a plurality of retention walls 14 and support walls 15 extending upwardly from the top surface 110, a pair of recesses 1110 recessed from the bottom surface 111. The pair of recesses 1110 is used for receiving a pair of fiber assembly 7. One of the retention walls 14 faces to one of the support wall 15, the retention wall 14 defines a hole 141, the support wall 15 correspondingly defines a groove 152.

The spring 4 includes a main portion 40, a pair of assembling portions 41 extending from opposite ends of the main portion 40 and a pair of hook portions 42 extending from the pair of assembling portions 41. Each of the assembling portions 41 defines a slot 4101 for assembling the rod member 3.

The locking member 2 is made of metal material and includes a body (transverse) portion 20, a pair of locking portions 21 extending from two opposite ends of the body portion 20. Each of the locking portions 21 includes a locking hole 201, a positioning hole 212 and a locking end 210 at the end of the locking portion 21. The protecting member 22 includes a U-shaped enwrapping portion 220, a pair of retention portions 221 extending downwardly from opposite ends of the enwrapping portion 220, and a pair of resisting portions 2211 bending from the retention portions 221. Each of the retention portions 221 defines a retention hole 2210 at a free end thereof and a blocking portion 2212 extending in a horizontal direction. The body portion 20 of the locking member 2 locates inside the U-shaped enwrapping portion 220. The retention portion 221 first extends in a vertical direction from the enwrapping portion 220, and then extends in a horizontal direction to form said blocking portion 2212 and then extends in a vertical direction.

After the retention member 100 is assembled, the rod member 3 goes through the retention hole 2210 of the retention portions 221 of the protecting member 22 and the slot 4101 of the assembling portions 41 of the spring 4 to assemble the rod member 3, the protecting member 22 and the spring 4 together; the locking portions 21 of the locking member 2 goes into the through holes 131 of the seat 1, and the rod member 3 goes through the holes 141 of the retention walls 14 and the positioning holes 212 of the locking member 2, the hook portions 42 hook with the locking holes 201 of the locking member 2, thus the rod member 3, the spring 4, the locking member 2, the protecting member 22 and the seat 1 are assembled together. The main portion 40 of the spring 4 is supported on the seat 1. The rod member 3 is received in the groove 152 of the support wall 15 to make the rod member 3 be securely positioned on the seat 1.

Figure 2:
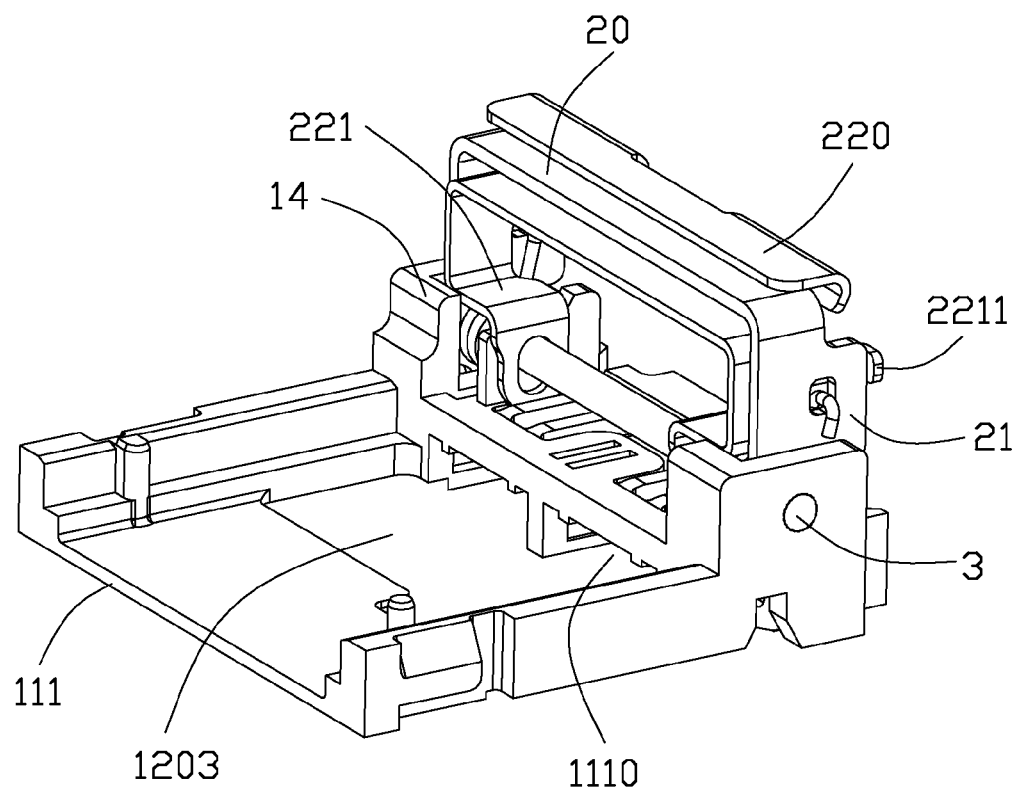
FIG. 2 is an assembled view of the retention member as shown in FIG. 1, wherein a protecting member of the retention member is resisted by the seat of the retention member and can not be rotated.
Figure 3:
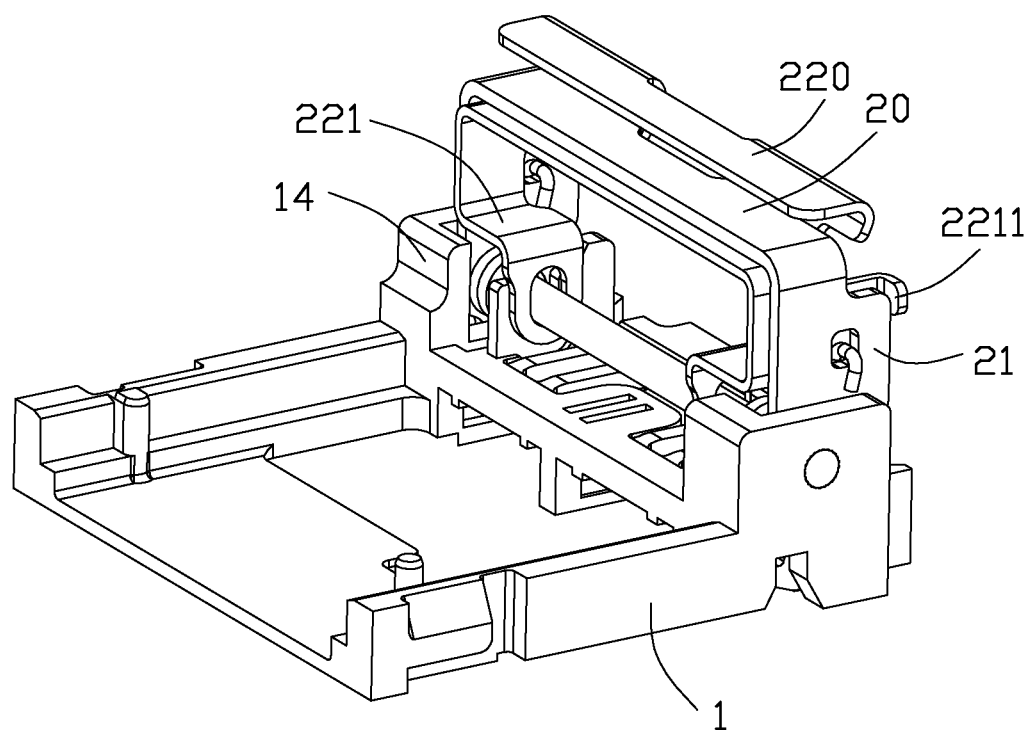
FIG. 3 is similar to FIG. 2, wherein the protecting member is lifted to break away from the resisting of the seat.

Referring to FIG. 2, the retention hole 2210 of the protecting member 22 is larger than a dimension of the rod member 3 in a vertical direction, the protecting member 22 can move according to the rod member 3 in the vertical direction. The enwrapping portion 220 of the protecting member 22 surrounds the body portion 20 of the locking member 2. The resisting portions 2211 of the protecting member 22 locate on an outer side the locking portions 21 of the locking member 2. In a natural state, the blocking portions 2212 of the protecting member 22 are lower than the retention wall 14 and the support wall 15 of the seat 1, thus, the blocking portions 2212 are resisted by the retention wall 14 and the support wall 15 of the seat 1 to make the protecting member 22 can not be rotated. Thus, the locking member 2 also can not be rotated due to the resisting of the protecting member 22. Referring to FIG. 3, when the protecting member 22 is raised, the blocking portions 2212 of the protecting member 22 are higher than the retention wall 14 and the support wall 15 of the seat 1, thus the protecting member 22 can be rotated and further the locking member 2 can be rotated.

Figure 4:
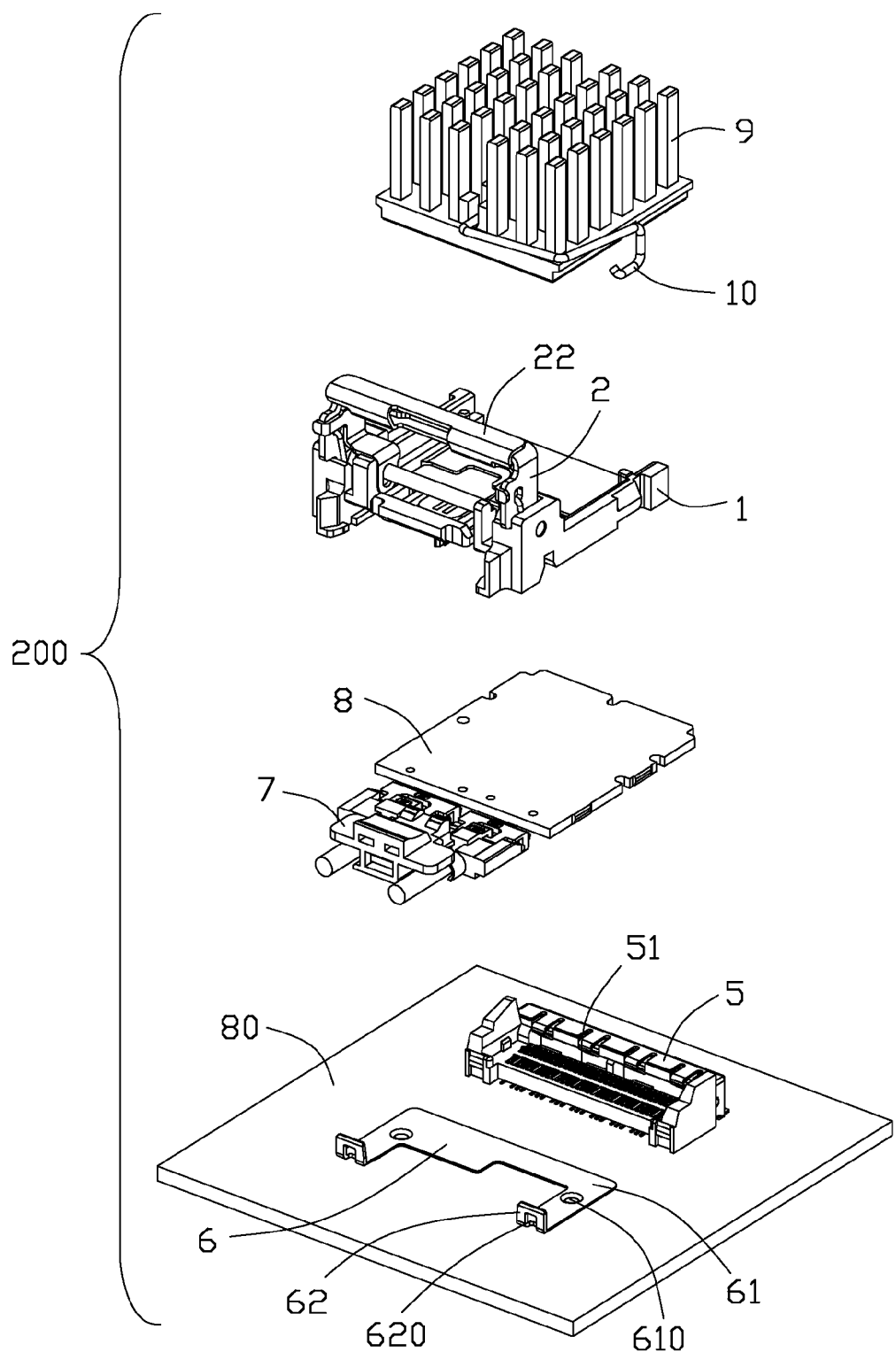
FIG. 4 is an exploded view of an electrical connector assembly which using the retention member.
Figure 5:
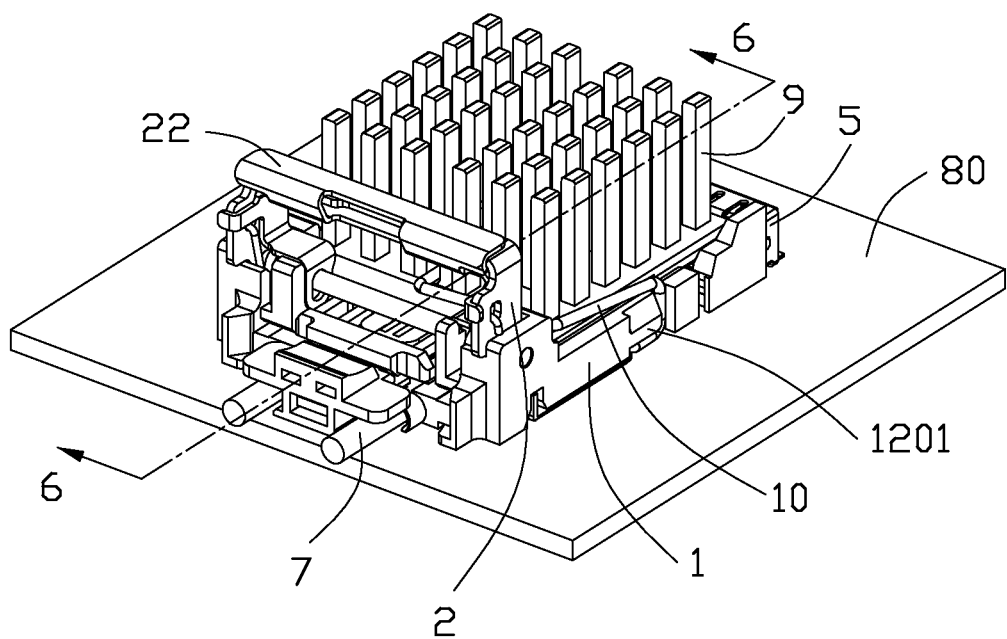
FIG. 5 is an assembled view of the electrical connector assembly and a substrate.
Figure 6:
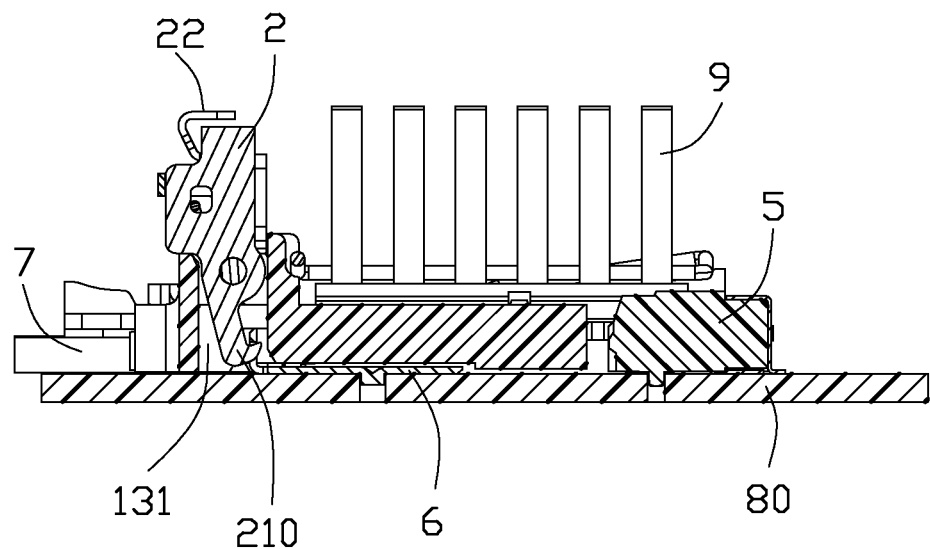
FIG. 6 is a cross-sectional view along line 6-6 as shown in FIG. 5.

Referring to FIGS. 4-6, an electrical connector assembly 200 which uses the retention member 100 includes a pair of fiber assemblies 7 assembled to the retention member 100, a heat sink 9 pressed on the optical module 8, a lever 10 assembled to the retention member 100 for positioning the heat sink 9, an electrical connector 5 set on the substrate 80 for electrically connecting with the optical module 8 and an interlocking member 6 assembled on the substrate 80 for positioning the locking member 2.

The electrical connector 5 includes a plurality of contacts 51. The interlocking member 6 includes a main portion 61 and a pair of interlocking portions 62 extending from the main portion 61. The main portion 61 defines a pair of posts 610 for positioning on the substrate 80. Each of the interlocking portions 62 defines an aperture 620 for interlocking with the locking end 210 of the locking member 2.

When the retention member 100 is used, the optical module 8 is received in the receiving space 1203 of the seat 1, the heat sink 9 presses on the optical module 8, the lever 10 presses on the heat sink 9 and interlocks with the blocks 1201, the fiber assemblies 7 are received in the pair of recesses 1110 of the seat 1 to align with the optical module 8 to transfer the optical signal to the optical module 8. So, an OE module including the retention member 100, the fiber assemblies 7, the optical module 8, the heat sink 9 and the lever 10 is completely assembled. And then insert the OE module to the electrical connector 5 in an inclined direction and press the OE module to a horizontal position to make the locking ends 210 of the locking member 2 to interlock with the interlocking portions 62 of the interlocking member 6, thus, to make a robust electrical connection between the optical module 8 and the electrical connector 5.

When need to remove the optical module 8, raise the protecting member 22 to make the blocking portions 2212 of the protecting member 22 higher than the retention wall 14 and the support wall 15 of the seat 1, and then rotate the protecting member 22 to drive the locking member 2 to be released, and the optical member 8 can be removed from the electrical connector 5.

In this embodiment, the locking ends 210 of the locking member 2 hooks with the interlocking member 6 set on the substrate 80, also the locking ends 210 of the locking member 2 can hook with the substrate 80 directly or hook with other members to make the optical module 8 contact with the contacts 51 of the electrical connector 5.

In a natural state, the locking portions 21 of the locking member 2 are lower than the retention wall 14 and the support wall 15 of the seat 1, thus, the locking portions 21 are resisted by the retention wall 14 and the support wall 15 of the seat 1 to make the protecting member 22 can not be rotated. Thus, the locking member 2 also can not be rotated due to the resisting of the protecting member 22. Thus, the protecting member 22 can prevent releasing of the locking member 2 in an unexpected condition. Notably, in this embodiment the locking member 2 and the protecting member 22 are discrete from each other. Anyhow, in an alternate embodiment, the locking member may be equipped with an upwardly deflectable protecting member to release the locking member from the interlocking member.

While the preferred embodiments in accordance with the present invention has been shown and described, equivalent modifications and changes known to persons skilled in the art according to the spirit of the present invention are considered within the scope of the present invention as defined in the appended claims.

What is claimed is:

1. A retention member for being positioned on a substrate for mounting an optical module and fiber assembly aligning with the optical module, comprising:
   a seat;
   a locking member assembled on the seat for positioning the seat on the substrate, the locking member can rotate to be released; wherein
   the retention member has a protecting member assembled on the seat, the locking member has a body portion, the protecting member has an enwrapping portion locating on an outer side of the body portion of the locking member, a pair of retention portions extending from opposite ends of the enwrapping portion, each of the retention portions has a blocking portion and the blocking portions are initially resisted by the seat to limit the rotations of the protecting member and the locking member, the retention portions also can be raised to make the blocking portions break away from the resisting of the seat, and the locking member then can be rotated to be released.

2. The retention member as claimed in claim 1, wherein the enwrapping portion is configured with U shape and the body portion of the locking member locates inside the U-shaped enwrapping portion.

3. The retention member as claimed in claim 1, wherein the retention portion first extends in a vertical direction from the enwrapping portion, and then extends in a horizontal direction to form said blocking portion and then extends in a vertical direction.

4. The retention member as claimed in claim 1, wherein in a natural state, the blocking portions of the protecting member are lower than the retention wall of the seat, when the protecting member is raised, the blocking portions of the protecting member are higher than the retention wall of the seat 1.

5. The retention member as claimed in claim 1, wherein the retention member further comprising a rod member assembled to the locking member and the protecting member and a spring assembled to the rod member, the spring interlocks with the locking member, the retention portion has a retention hole for assembling the rod member.

6. The retention member as claimed in claim 1, wherein the protecting member further includes a resisting portion bending from the retention portion and locates on an outer side of the locking member.

7. The retention member as claimed in claim 1, wherein the seat includes a support portion and a head portion extending from the support portion, the support portion includes a bottom wall and a pair of sidewalls extending from opposite ends of the bottom wall, the bottom wall and the pair of sidewalls form a receiving space for receiving the optical module.

8. The retention member as claimed in claim 7, wherein the head portion defines a top surface higher than the bottom wall and a bottom surface opposite to the top surface, the bottom surface has a recess recessed from the bottom surface for receiving the fiber assembly.

9. A retention member for being positioned on a substrate for mounting optical module and fiber assembly aligning with the optical module, comprising:
    a seat including a space for receiving the optical module and a recess for receiving the fiber assembly;
    a locking member assembled on the seat for positioning the seat on the substrate, the locking member can rotated to be released;
    a rod member assembled to the seat and the locking member for positioning the locking member on the seat;
    a spring assembled to the rod member and supported on the seat; wherein
    the retention member has a protecting member assembled to the rod member, the protecting member has an enwrapping portion locating on an outer side of the locking member, a pair of retention portions extending from opposite ends of the enwrapping portion, each of the retention portions has a blocking portion and the blocking portions are resisted by the seat to limit the rotation of the protecting member and the locking member, the retention portions can be raised to make the blocking portions break away from the resisting of the seat and the locking member can be rotated to be released.

10. The retention member as claimed in claim 9, wherein the enwrapping portion is configured with U shape and the body portion of the locking member locates inside the U-shaped enwrapping portion.

11. The retention member as claimed in claim 9, wherein the retention portion first extends in a vertical direction from the enwrapping portion, and then extends in a horizontal direction to form said blocking portion and then extends in a vertical direction.

12. The retention member as claimed in claim 9, wherein in a natural state, the blocking portions of the protecting member are lower than the retention wall of the seat, when the protecting member is raised, the blocking portions of the protecting member are higher than the retention wall of the seat.

13. The retention member as claimed in claim 9, wherein the seat includes a support portion and a head portion extending from the support portion, the support portion includes a bottom wall and a pair of sidewalls extending from opposite ends of the bottom wall, the receiving space are formed by the bottom wall and the pair of sidewalls.

14. The retention member as claimed in claim 13, wherein the head portion defines a top surface higher than the bottom wall and a bottom surface opposite to the top surface, the recess is formed on the bottom surface.

15. A retention member assembly comprising:
    a seat adapted to be positioned upon a printed circuit board and hold an optical module therein;
    a locking member pivotally mounted upon the seat and forming a lower locking end adapted to be latched to an interlocking portion located on the printed circuit board;
    a spring associated with the locking member to constantly urge the locking member to be latched to the interlocking portion; and
    a protecting member associated with the locking member; wherein
    said protecting member is moveable relative to the seat and to the locking end between a free position and a restraint position, and includes a retention portion which is restrained by the seat so as to prevent the locking member from being inadvertently unlocking when the protecting member is moved to the restraint position, and is free from the seat so as to allow intentional release of the locking member from the interlocking portion when the protecting member is moved to the free position.

16. The retention member assembly as claimed in claim 15, wherein the protecting member is up and down moveable relative to the seta and to the locking end, and the free position is higher than the restraint position.

17. The retention member assembly as claimed in claim 15, wherein the protecting member is discrete from the locking member.

18. The retention member assembly as claimed in claim 15, wherein said locking member is pivotal about an axis extending along a horizontal transverse direction, and the spring surrounds said axis.

19. The retention member assembly as claimed in claim 15, wherein the locking member includes a transverse portion, and the protecting member includes an enwrapping portion enclosing said transverse portion in an up-and-down restrictively floating manner.

20. The retention member assembly as claimed in claim 19, wherein said enwrapping portion prevents the transverse portion from outwardly moving.

* * * * *